United States Patent [19]

Morris

[11] Patent Number: 4,600,065

[45] Date of Patent: Jul. 15, 1986

[54] APPARATUS FOR FILLING CONTAINERS WITH PRIMARY AND SECONDARY SUPPLY CHUTES

[75] Inventor: Billy J. Morris, Visalia, Calif.

[73] Assignee: Industrial Manufacturers of Orosi, Orosi, Calif.

[21] Appl. No.: 689,172

[22] Filed: Jan. 7, 1985

[51] Int. Cl.⁴ .................. G01G 13/00; G01G 13/02
[52] U.S. Cl. .................................... 177/123; 177/53; 141/128; 198/505
[58] Field of Search ............... 177/52, 53, 123, 57, 177/58, 122; 198/343, 505; 53/55, 248; 141/83, 128, 134

[56] References Cited

U.S. PATENT DOCUMENTS

| | | | |
|---|---|---|---|
| 2,908,475 | 10/1959 | Roberts | 177/53 |
| 3,416,619 | 12/1968 | McClusky | 177/53 |
| 3,627,101 | 12/1971 | McClusky | 177/53 X |
| 3,814,196 | 6/1974 | McClusky | 177/123 X |
| 4,284,380 | 8/1981 | Brumbaugh, Jr. et al. | 141/83 X |

Primary Examiner—E. A. Goldberg
Assistant Examiner—Patrick W. Foster
Attorney, Agent, or Firm—Worrel & Worrel

[57] ABSTRACT

An apparatus for filling containers with a substantially precise, predetermined weight of articles, such as fruit and the like, providing a frame mounting a first station, a second station, and a third station disposed serially of each other; an article-diverting assembly having a fast-fill chute adapted to direct articles toward a container supported on the second station and a slow-fill chute adapted to direct articles toward a partially-filled container on the second station; means for sensing the weights of the containers on the second and third stations; and means for moving the containers from the first to the second and third stations.

19 Claims, 10 Drawing Figures

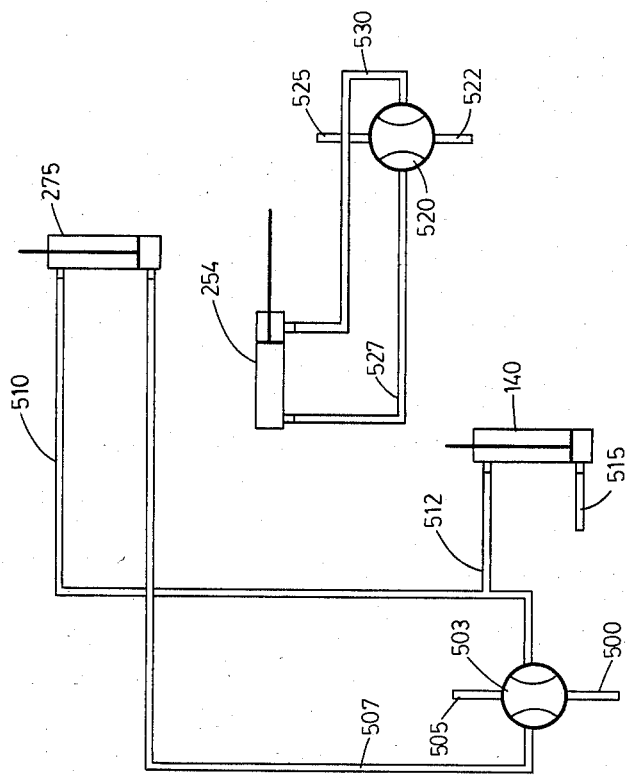
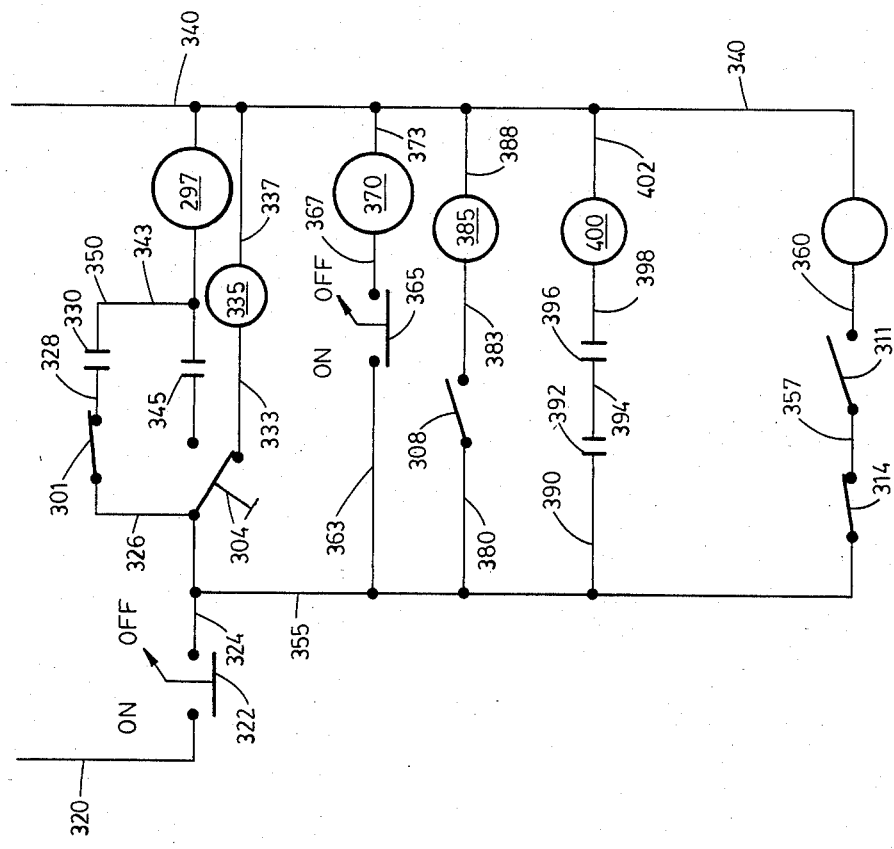
FIG. 5

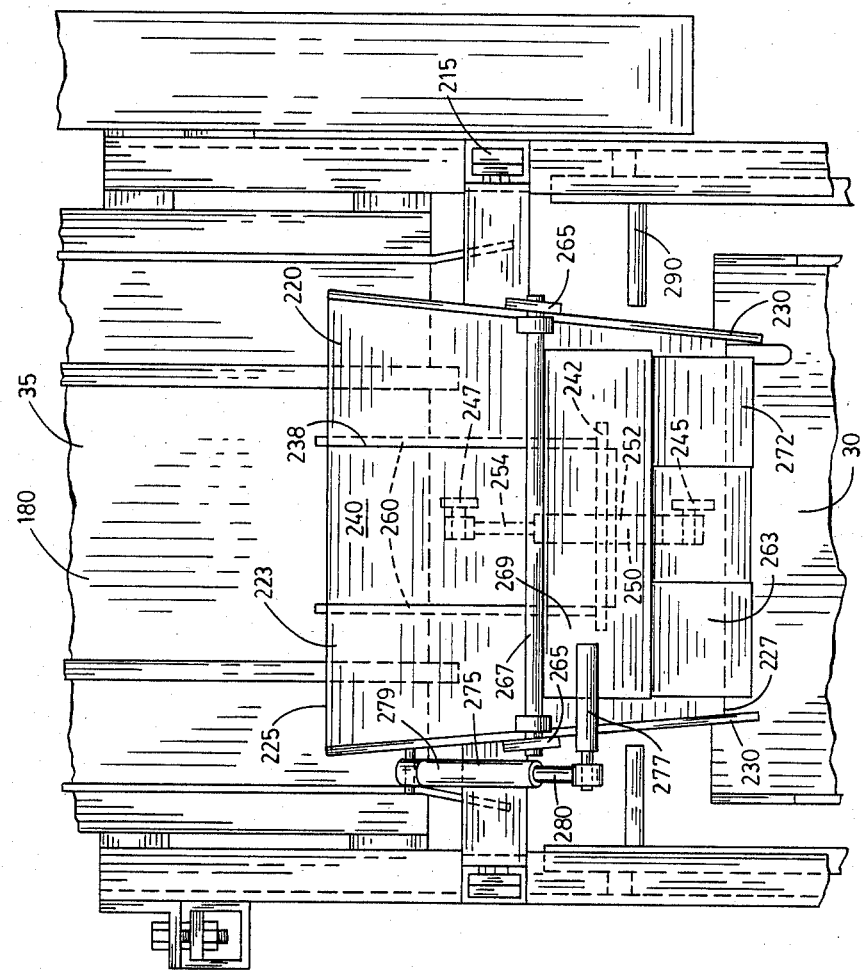

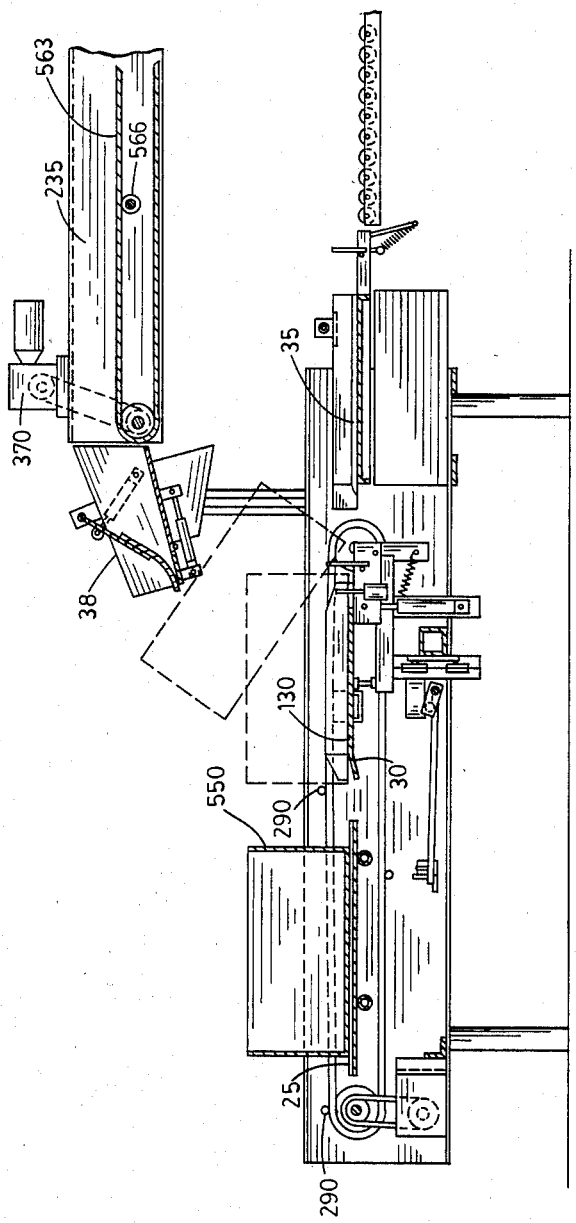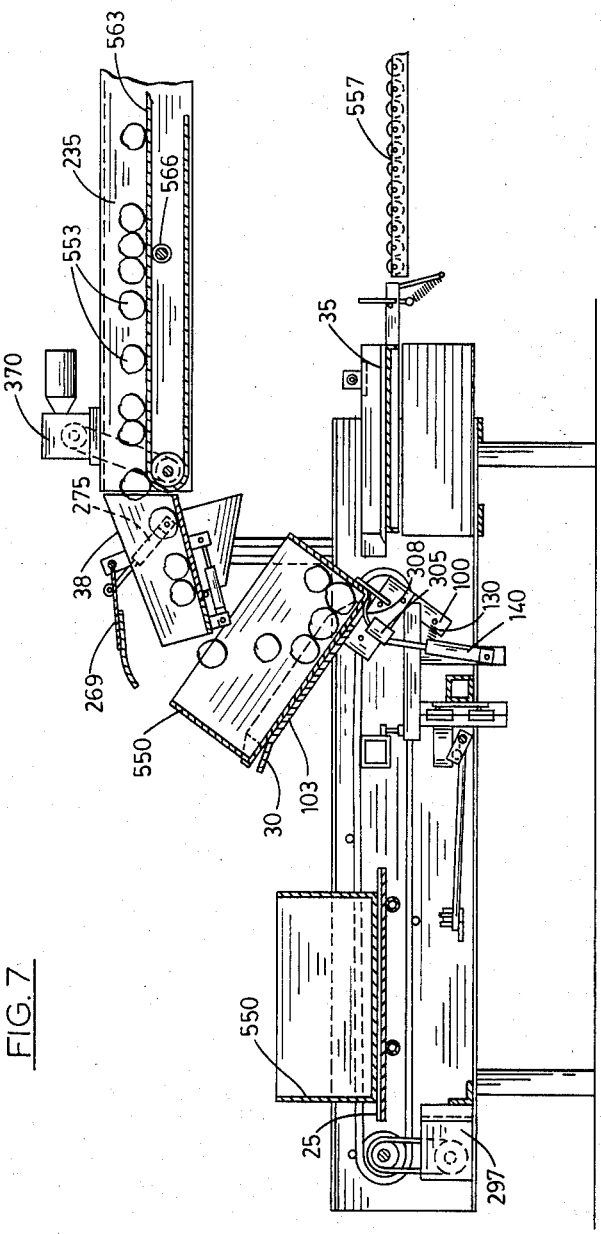

4,600,065

APPARATUS FOR FILLING CONTAINERS WITH PRIMARY AND SECONDARY SUPPLY CHUTES

BACKGROUND OF THE INVENTION

1. Field of the Invention

The present invention relates to an apparatus for filling containers and more particularly to such an apparatus which is adapted accurately and rapidly to fill containers to a predetermined weight with a plurality of articles.

2. Description of the Prior Art

The use of mechanized apparatus in the packing of containers with articles, and especially crop articles such as fruits and vegetables, has long been known. It is a recognized commercial practice to ship such crops in containers bearing a predetermined weight of the articles. It is economically desirable that the weight of articles deposited in each container by the packaging apparatus be as close as practical to such predetermined weight in order to eliminate or substantially reduce overfilling and underfilling the containers.

Apparatus have been proposed in the art for use in filling containers to a predetermined weight with crops such as potatoes, fruit and the like, and such apparatus have generally provided a first filling station adapted to fill the containers with articles from a supply of crops to a predetermined weight which is less than the desired weight. Such apparatus further have generally provided a second station at which the containers are filled to approximately the desired weight. Typically, the filling operation at the first station of such an apparatus takes place fairly rapidly, while the depositing of crops or other articles in containers at the second station occurs at a slower pace relative to that of the first station to permit fairly accurate termination of the filling operation at the second station upon arrival at an approximate predetermined weight.

While such apparatus have been generally successful in accomplishing their intended purposes, their use has been attended by a number of deficiencies and drawbacks. For instance, it has been recognized that the delivery of articles to the first and second filling stations of such apparatuses often must be slowed down or stopped completely during the operation of the apparatus in order to prevent congestion of articles at either the first or second stations. This is due, in part, to the relatively slow pace of the filling operation at the second stations, and is also attributable to the limitations of the means provided by such apparatuses for diverting articles to the second station. Very often, it is seen that congestion, overflow, or sporadic delivery of fruit at the second station necessitates shutting down the operation of the apparatus to correct such problems or, alternatively, results in the container remaining at the second station for a prolonged period of time awaiting the delivery of successive articles of fruit to bring the container to the predetermined weight. Moreover, it is well known that such apparatus often are constructed having bulky exterior dimensions, thereby preventing the use of multiple filling apparatuses in packing sheds and like environments having limited space. Further, the size of such apparatuses sometimes limits the usefulness of them in operative environments in which the apparatus are desired to be employed in multiples in receiving relation to conventional crop sizing apparatuses.

Finally, another drawback of such known apparatuses is that they generally provide separate delivery mechanisms for delivering articles to the first and second station, such mechanisms usually requiring separate drive apparatus for the operation of the delivery mechanisms. Thus, the use of conventional apparatus is attended by an increased likelihood of malfunction of one or more component parts of the apparatus, with an accompanying increase in the possibility of "down time" during which the apparatus is not available for its intended use.

Therefore, it has long been known that it would be desirable to have an apparatus for the rapid filling of containers with articles to a predetermined weight having a compact, reliable construction adapted to perform such filling operation with a speed and reliability previously unattainable.

OBJECTS AND SUMMARY OF THE INVENTION

Therefore, it is an object of the present invention to provide an improved container packing apparatus adapted to fill containers with articles to a predetermined weight.

Another object is to provide such an apparatus which is substantially compact in dimensions to permit the use of the apparatus in multiples in a typical operative environment.

Another object is to provide such an apparatus which is fully compatible with commonly available, commercially utilized article-sizing and conveying means.

Another object is to provide such an apparatus which operates with a rapidity previously unattainable.

Another object is to provide such an apparatus which is exceedingly durable for operation thereof over an extended operational life.

Another object is to provide such an apparatus which can be constructed economically and sold at a nominal price.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 5 is a schematic circuit diagram showing means for portions of the apparatus of FIG. 1, together with a schematic flow diagram of a pneumatic system adapted for use in the operation of the apparatus.

FIG. 6 is a somewhat enlarged, fragmentary longitudinal section taken on line 6—6 of FIG. 1 of a portion of the container pre-fill station of the apparatus of FIG. 1, showing a container supported in an article-receiving attitude in phantom lines.

FIG. 7 is a longitudinal sectional view generally taken on line 7—7 in FIG. 2 and showing a container supported by the apparatus, the container being shown in alternate positions in phantom lines, and further including a fragmentary longitudinal sectional view of a representative article conveyor operable to convey articles to the apparatus.

FIG. 8 is a side elevation of the apparatus of FIG. 7 showing a first container supported by the apparatus in an article-receiving attitude and a second container supported by the apparatus in trailing relation to the first container.

DESCRIPTION OF THE PREFERRED EMBODIMENT

Figure 1:
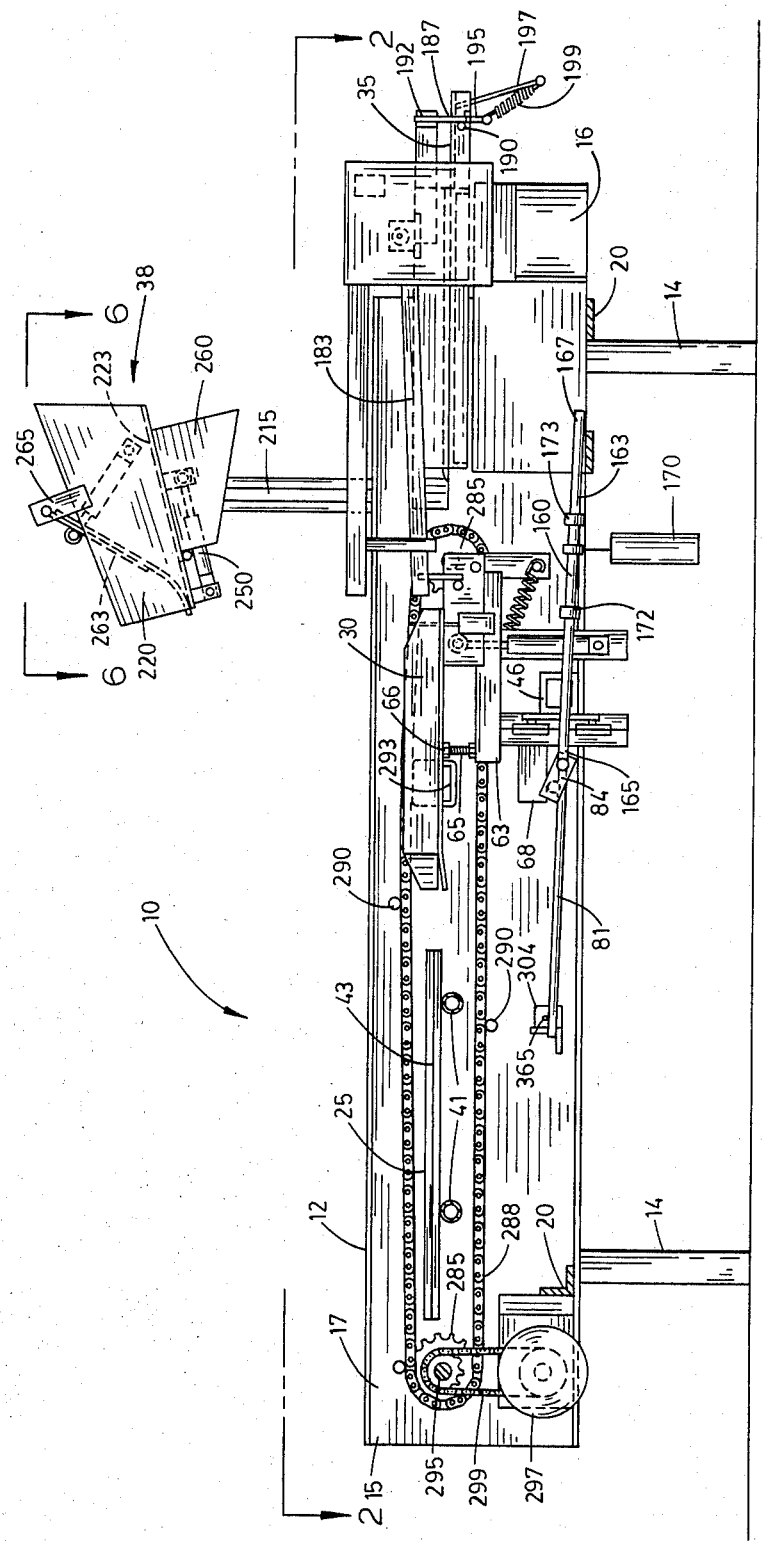
FIG. 1 is a side elevation of the apparatus of the present invention with portions thereof removed for illustrative purposes and showing first, second and third stations.
Figure 2:
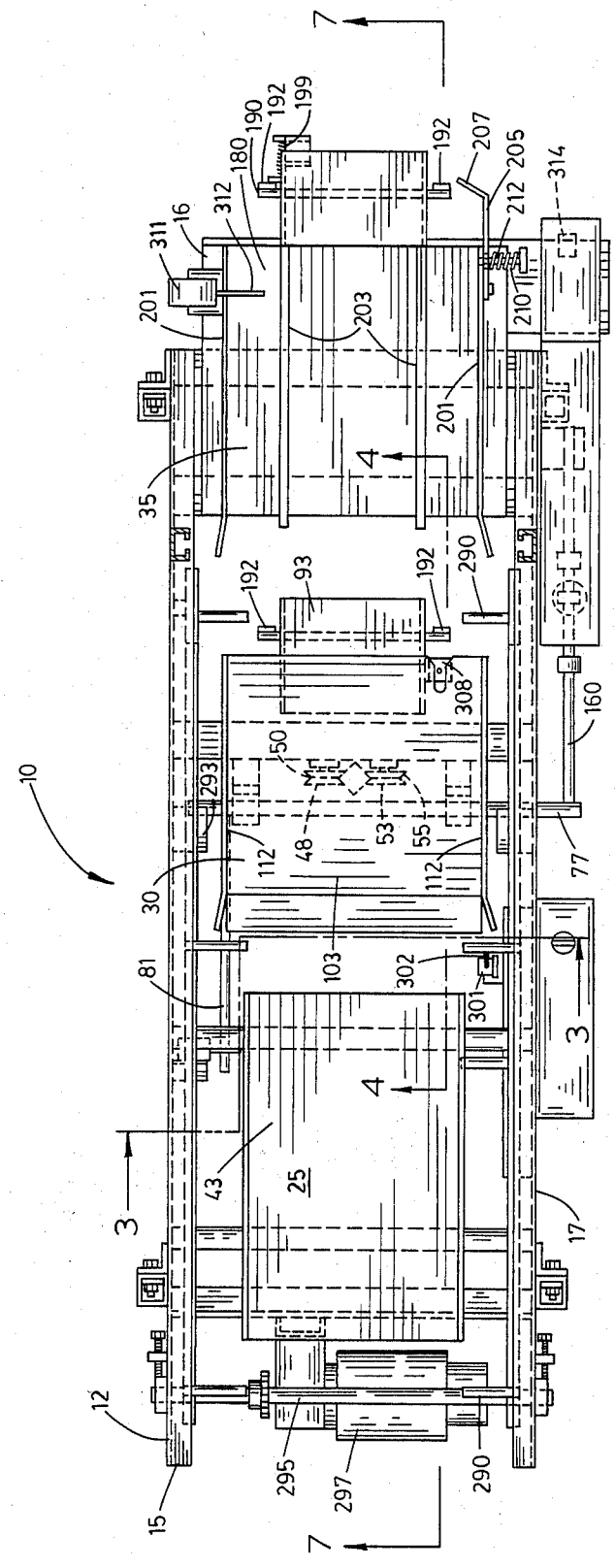
FIG. 2 is a top plan view of the apparatus of FIG. 1, taken on line 2—2 in FIG. 1.

Referring with greater particularity to the drawings, the apparatus embodying the principles of the present invention is designated generally by the numeral 10 in FIG. 1. In FIG. 2, the apparatus is shown in side elevation with portions removed for illustrative purposes.

The apparatus 10 generally provides a frame 12 supported on legs 14 and having a first end portion 15 and an opposite, second end portion 16. The frame includes a pair of elongated side panels 17 spaced a predetermined distance and disposed in generally upstanding, substantially parallel relation. The side panels 17 are maintained in spaced relation by a plurality of cross braces 20 transversely interconnecting the side panels.

The apparatus generally provides a first, or container-receiving, station 25; a second, or container pre-fill, station 30; and a third, or final-fill, station 35. As can best be seen upon reference to FIGS. 1 and 2, the first, second and third stations are disposed serially of each other and are spaced longitudinally from each other along the frame 12. The frame further mounts a gate mechanism or article-diverting assembly 38 above the frame and disposed in a predetermined elevated attitude relative to the pre-fill station 30 and final-fill station 35.

The container receiving station 25 is disposed in proximity to the first end portion 15 of the frame 12 and, as can best be seen in FIGS. 1 and 2, provides a pair of transversely disposed support bars 41 extending between the two side panels. A container support plate, or platform, 43 is borne by the bars and is disposed in a substantially horizontal attitude. The container support platform is dimensioned to support a container such as a carton of the type employed for packing fruit.

Figure 3:
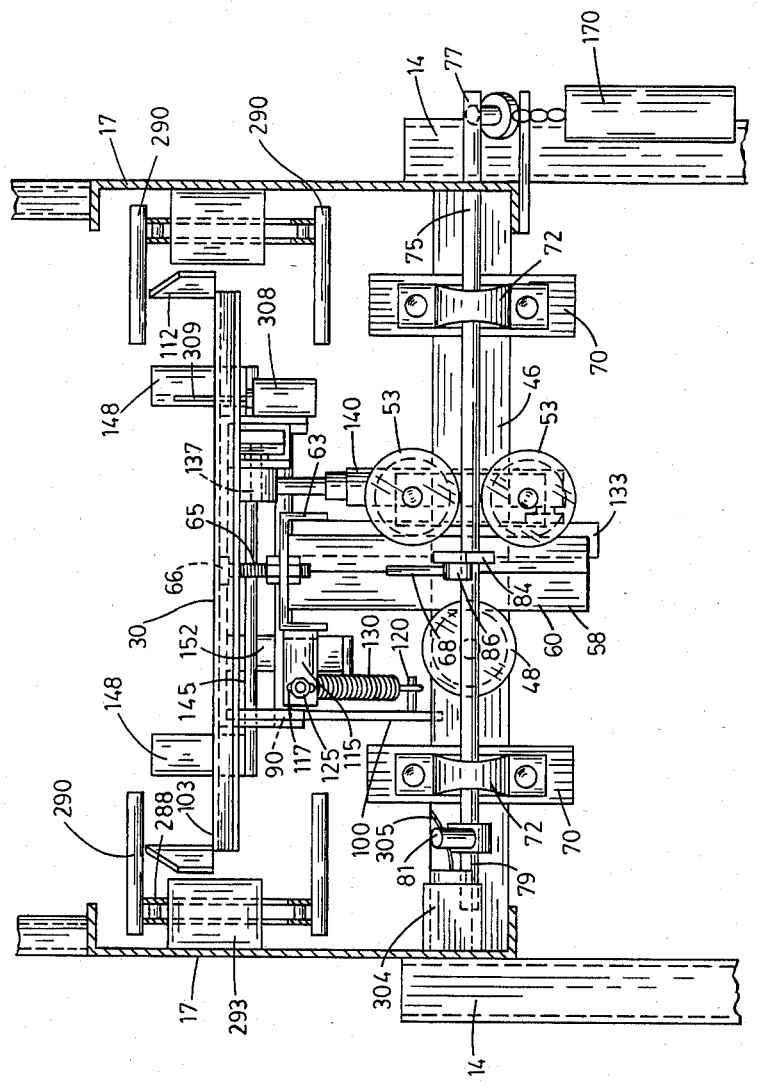
FIG. 3 is a somewhat enlarged transverse section taken on line 3—3 in FIG. 2, showing portions of the container pre-fill station of the apparatus of FIG. 1.

The pre-fill station 30 is illustrated in greater detail in FIGS. 3 and 6. As shown in the figures, the pre-fill station provides a transverse support beam 46 extending between the side panels 17 and secured on its opposite ends thereto. The transverse beam mounts a first roller 48 having a circumferentially extending slot or groove 50 around roller 48. The first roller is mounted for rotation about an axis substantially perpendicular to the transverse beam. The transverse beam mounts a pair of second rollers 53 spaced from the first roller and each provides a circumferential groove 55. The pair of second rollers are individually mounted for rotation thereof about substantially parallel axes disposed substantially perpendicularly to the transverse beam. Collectively, the first roller 48 and the second rollers 53 comprise a bearing mechanism.

An elongated, double V-shaped beam 58 is provided having transversely opposite edges 60. The beam 58 is dimensioned to permit it to ride on a substantially vertical path with its opposite edges received substantially closely in the circumferential grooves 50 and 55 of the rollers 48 and 53 as the rollers rotate about their axes. Accordingly, the bearing mechanism defined by the rollers is operable to maintain the beam 58 in a substantially erect attitude during vertical movement of the beam At the uppermost end of the double V-shaped beam 58 is secured a mounting arm 63 extending substantially horizontally from the beam a predetermined length. An adjustment bolt 65 is screw-threadably received through the arm and provides an end portion 66 extending upwardly from the arm and screw-threadably adjustable for movement of the end portion toward and away from the arm. The double V-shaped beam mounts a detent 68 which extends rigidly from the beam toward the first end portion 15 of the frame 12.

The transverse support beam 46 mounts a pair of brackets 70 spaced from each other along its length and each provides a pivot mount portion 72. An elongated axle or rod 75 extends through the pivot mounts transversely of the frame for rotation of the rod within the pivot mounts about the longitudinal axis of the rod. The rod has an external end portion 77 extending through one side panel of the frame and an opposite, second end portion 79 internal of the frame and spaced a predetermined distance from the external end portion. The second end portion of the rod mounts an elongated switch trigger shaft 81 constructed in the form of an elongated bar. The switch trigger shaft is mounted for rotation with the rod about its axis of rotation.

The rod 75 further mounts a block 84 rigidly secured to rod 75 for rotation with rod 75 about the axis of rotation. The block mounts a detent stop 86 extending transversely from block 84 and dimensioned for engagement of detent stop 86 the detent 68 upon movement of the double V-shaped beam 58 downwardly along its vertical path.

Mounted transversely on the rearward portion of the mounting arm 63 is a pivot axle 90 secured to mounting arm 63 as by welding or the like. The axle is disposed substantially transversely of the frame and has a predetermined length. A tray support frame 93 having an upper panel 95 and a pair of depending side panels 97 is mounted for pivotal movement toward and away from the mounting arm 63 about the pivot axle. The tray support frame 93 further provides a frame actuating arm 100 secured on one of the side panels 97 and depending substantially normally from the upper panel 95 for rotation therewith about the pivot axle.

The pre-fill station 30 further provides a container support tray 103 having a substantially flat bottom panel 105 that has a rearward portion 107 supported on the upper panel 95 of the tray support frame 93. The bottom panel 105 further provides a forward end portion 109 deflected or angled downwardly from the plane in which lies the bottom panel.

As can best be seen in FIG. 2, the container support tray 103 further provides a pair of side panels 112 spaced from each other across the bottom panel 105 and each disposed in a substantially upright attitude. As can best be seen in FIGS. 1 and 3, the side panels are divergent from each other along their forward end portions.

As can best be seen in FIG. 3, the mounting arm 63 mounts a transversely disposed spring mounting plate 115 extending substantially normally from the arm and secured to arm 63 by welding or the like. The spring mounting plate provides a slot 117 of predetermined dimensions.

The frame actuating arm 100 provides a spring mounting rod 120 extending normally therefrom and disposed in predetermined spaced relation to the spring mounting plate 115. A spring mounting bolt 122 extends through the slot 117 in the spring mounting plate 115 and provides a first end portion screw-threadably mounting an adjustment nut 125 and an opposite, second end portion bearing a hook or loop portion 127. A frame actuating spring 130 is extended between the spring mounting rod 120 and the loop portion 127 of the second end portion of the spring mounting bolt 122.

As can best be seen in FIGS. 6 and 7, when the container support tray 103 is disposed in a first, substantially horizontal attitude, the spring is stretched or extended and has a tendency to exert force on the frame actuating arm 100 to cause the tray support frame 93 to pivot about the pivot axle 90.

The mounting arm 63 mounts a cylinder mounting plate 133 extending downwardly and rigidly secured to the plate. The cylinder mounting plate provides a first shaft 135 extending substantially perpendicularly from its lower end portion. A second shaft 137 is secured as by welding or the like on one of the side panels 97 of the tray support frame 93 and extends substantially perpendicularly from support frame 93 toward the opposite side panel 97. A retention cylinder 140 is provided having a piston portion 142 pivotally connected to the second shaft 137 and a cylinder portion 143 pivotally borne by the first shaft 135. Preferably, the retention cylinder is a pneumatic cylinder adapted operatively to be connected by gas supply and return lines to a source of compressed gas (not shown) in a substantially conventional manner whereby, upon actuation of the cylinder, the piston portion 142 is drawn into the cylinder portion 143 to exert a substantially downwardly directed force upon the tray support frame 93 to draw the tray support frame toward the mounting arm 63.

However, it is understood that the retention cylinder could be constructed in different forms, such as in the manner of a conventional hydraulic cylinder or one specially adapted for use in the apparatus of the present invention. Further, it will be seen that operation of the retention cylinder to exert downwardly directed force against the tray support frame will counteract the force exerted on the tray support frame 93 by the frame actuating spring 130, and release of the piston portion 142 from the cylinder portion 143 will permit the spring to move the tray support frame about the pivot axle 90.

Figure 4:
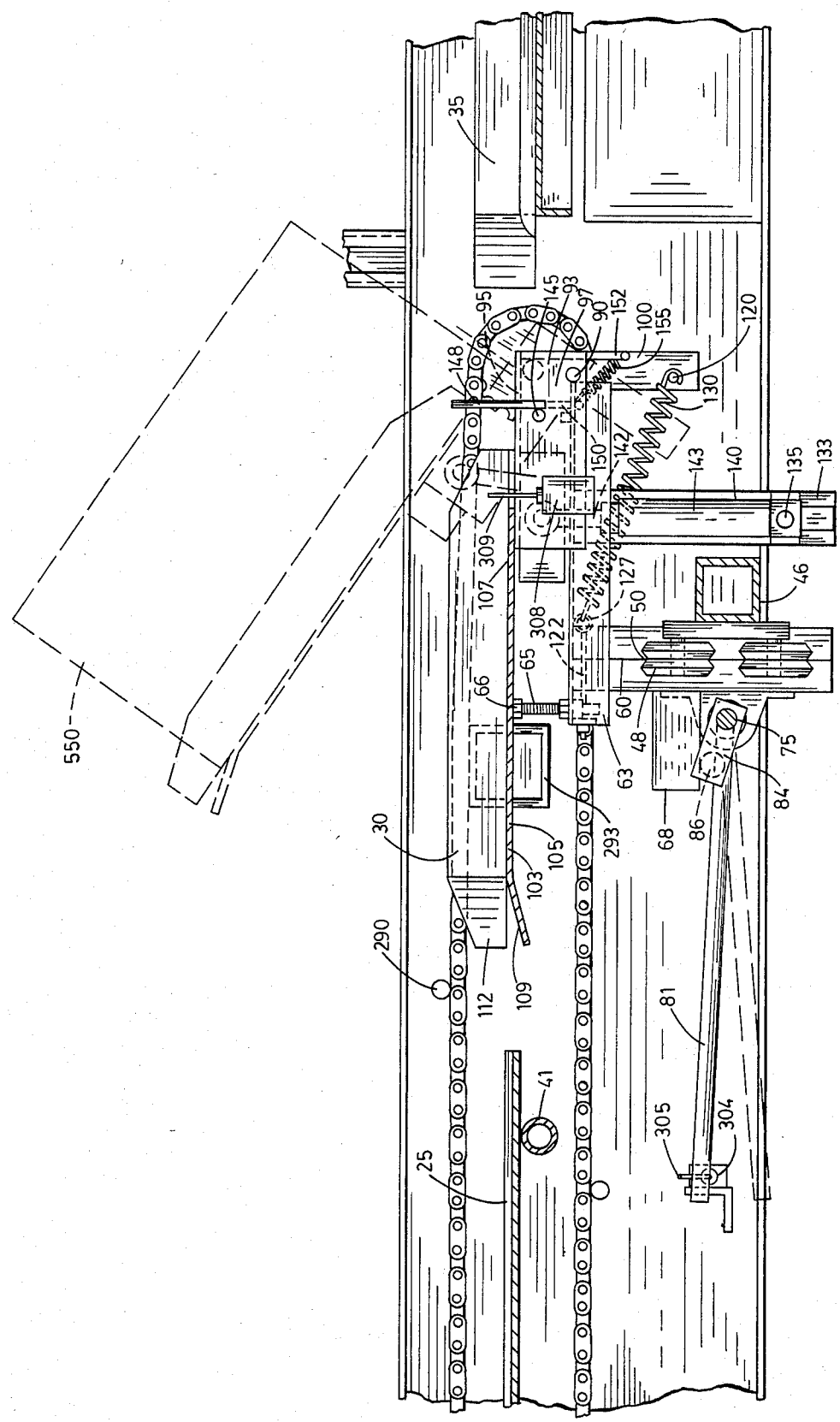
FIG. 4 is a somewhat enlarged, fragmentary, top plan view generally indicated by lines 4—4 in FIG. 2.

As can best be seen in FIG. 4, the tray support frame 93 mounts a container retaining axle 145 disposed substantially transversely to the frame 12 of the apparatus 10 mounted for pivotal rotation about an axis substantially normal to the side panels 97 of the tray support frame 93. Secured to the container retaining axle 145 is a pair of spaced stop members 148 disposed rearwardly of the container support tray 103 and extending upwardly from the tray support frame 93. The container retaining axle 145 further provides a spring mounting arm 150 secured to it as by welding or the like and depends therefrom. The tray support frame 93 provides a second spring mounting arm 152 extending downwardly substantially normally from the upper panel 95.

A retention spring 155 extends between the first and second spring mounting arms. As can best be seen in FIG. 6, the spring 155 is generally disposed to exert force against the spring mounting arm 150 secured to the container retaining axle 145 and to exert force against container retaining axle 145 to maintain the stop members 148 in a substantially vertical attitude.

The container pre-fill station 30 further provides a counterbalance assembly 160 borne externally of the frame by the elongated rod 75. The counterbalance assembly provides a lever 163 having a first end portion 165 secured on the rod 75 and a second end portion 167 remote from the first end portion. A weight 170 is borne by the beam and is slidably positionable along the beam. It will be apparent that the further the weight is positioned from the rod, the greater the force will be that is exerted thereby about the axis of rotation of the rod. As can best be seen in FIG. 1, a first indicator marker 172 and a second indicator marker 173 are provided and are spaced longitudinally from each other along the lever. The first and second indicator markers can be positioned to correspond to various predetermined weights as may be required by the application for which the apparatus is intended. It will further be seen that engagement of the detent stop 86 by the detent 68 mounted on the double V-shaped beam 58 as the beam travels downwardly between the rollers 48 and 53 will effect a counterforce against the weight 170 mounted on the lever 163. Thus, repositioning of the weight along the lever will effect changes in the amount of force necessary to be exerted by the detent against the detent stop to rotate the elongated rod. Therefore, the counterbalance assembly 160 can be adjusted to accommodate differing weights of pre-filled containers supported on the container support tray 103 of the pre-fill station 30.

The final-fill station 35 generally provides a tray support platform 180 borne by the frame 12 and disposed in container-receiving relation to the pre-fill station 30. The final-fill station provides a scale assembly 183 adapted to be calibrated or otherwise set to sense a predetermined weight deposited upon the platform. The scale can be of virtually any suitable construction, such as a conventional counterbalance providing a beam having an adjustable weight borne by the beam, substantially in the manner of the counterbalance 163.

The final-fill station also provides a box stop assembly 187 including a transversely mounted axle 190 having a pair of box stops 192 borne in substantially upstanding relation spaced from each other on the opposite end portions of the axle. An arm 195 depends from the axle and is rigidly secured to it. A second arm 197 extends obliquely downwardly and rearwardly from the platform 180 and is rigidly secured to it. A spring 199 interconnects the arms and exerts force against the arm 195 borne by the axle 190 yieldably to retain the box stops 192 in a generally upright attitude, as shown in FIGS. 1 and 7 through 10.

As can best be seen in FIG. 2, the platform provides a pair of upstanding guide walls 201 spaced from each other transversely across the platform a predetermined width. A plurality of upstanding ribs 203 are mounted between the walls on the platform and are disposed to support containers received thereon and to minimize the friction between the platform and the containers. One of the walls mounts an auxillary container detent mechanism 205 having a detent arm 207 disposed to engage a portion of a container received on the final-fill station platform. The arm is yieldably biased against the wall by a spring 210 borne on a shaft 212 secured to the wall 201, as can best be seen in FIG. 1.

The article-diverting assembly 38 is supported on the frame 12 and is carried on a pair of upright posts 215 mounted in spaced relation from each other on opposite sides of the frame in generally upstanding relation to the frame. The posts support a primary chute member 220 secured to their upper end portions and carried in an elevated attitude relative to the pre-fill and final-fill stations. The chute member generally provides a substantially flat bottom panel 223 having a predetermined rearward edge 225 and an opposite, forward edge 227. Spaced from each other on opposite sides of the bottom panel are a pair of generally upstanding, substantially flat walls 230 which are forwardly convergent. The walls are spaced a predetermined distance from each other at the rearward edge of the bottom panel of the chute member. The distance by which the walls are separated is dependent largely upon the environmental article supplying means available for bringing articles to be deposited in containers to the article-diverting assembly. Such means could include, for instance, a conventional endless conveyor, such as the conveying apparatus 235 shown in FIGS. 7 through 10 and described in greater detail below.

The bottom panel further provides an interior edge 238 of generally rectangular configuration and disposed substantially centrally between the walls rearwardly of the forward edge.

The chute member further provides a door 240 borne on a hinge 242 mounted subjacent to the bottom panel 223. The door is substantially flat and is dimensioned substantially closely to be received within the opening defined by the interior edge 238.

A first mounting plate 245 is secured as by welding or the like below the bottom panel. A second mounting plate 247 is mounted below the door. An actuating cylinder 250 providing a cylinder portion 252 and a piston portion 254 is secured on the mounting plates with its cylinder portion pivotally mounted on the first mounting plate and the piston portion being pivotally mounted on the second mounting plate. As can best be seen upon reference to FIGS. 7 through 10, extension of the piston portion from the cylinder portion maintains the door in a substantially closed relationship, occluding the opening defined by the interior edge of the bottom panel, and retraction of the piston portion within the cylinder allows the door to pivot about the hinge away from the bottom panel. The cylinder is preferably, although not necessarily, a pneumatically operated cylinder adapted to be connected to a source of compressed gas (not shown) through appropriate supply and return lines, also not shown.

The chute member also provides a second pair of walls 260 secured in spaced relation beneath the bottom panel and defining a secondary chute. The walls are spaced to permit travel of the door therebetween and to prevent lateral escape of articles departing through the opening defined by the interior edge.

An article gate assembly 263 is borne by the chute member. As can best be seen by reference to FIG. 4 and FIGS. 7 through 10, the gate assembly provides a pair of upstanding mounts 265 spaced from each other by the walls of the chute member. An axle or shaft 267 extends between the mounts for pivotal movement about an axis of rotation. Borne by the shaft is a substantially rigid gate 269 from which extends a sweep member 272 constructed of material having greater resiliency than that of which the gate is constructed. In a closed attitude, illustrated in FIG. 7, the gate is positioned to dispose the sweep member 272 in substantially occluding relationship between the walls 230 and along the forward edge portion.

An actuating cylinder 275 is borne externally on one of the walls and provides a linkage arm 277 pivotally secured to cylinder 275 and attached to the gate 269. The actuating cylinder is preferably, although not necessarily, of substantially conventional design and construction and is preferably pneumatically operated. The actuating cylinder provides a cylinder portion 279 and a piston portion 280. The actuating cylinder is adapted to be connected to a conventional source of compressed gas supply (not shown). As can best be seen upon reference to FIG. 10, upon actuation of the cylinder to extend the piston portion therefrom, the gate is carried to a second, or opened, attitude to permit the exit of articles from the chute member.

Referring to FIGS. 1 and 2, the apparatus provides conveying means mounted by the frame for moving or delivering containers from the container-receiving station 25 to the container pre-fill station 30 and subsequent to the final-fill station 35. The conveying means of the preferred embodiment comprises a pair of pulleys 285 mounted by each side panel 17 and aligned with the corresponding pulley on the opposite side panel. The pulleys are spaced from each other a predetermined distance, with one of the pulleys mounted between the container-receiving station and the first end portion of the frame, and the other pulley mounted between the container pre-fill station and the final-fill station. Each pulley is mounted for rotation about an axis substantially transverse to the longitudinal aspect of the frame. Each pair of pulleys has an endless belt 288 looped about their peripheries. The endless belt can be of any desired construction and, in the preferred embodiment, the belt is constructed of a multiplicity of interconnected links. A plurality of container-engaging members 290 are borne by the endless belt and are spaced a predetermined distance from each other, preferably a distance roughly equal to that which a container must travel between the pre-fill station and the final-fill station when fully deposited on the stations, respectively. The container-engaging members extend transversely of the belt toward the opposite side panel. Each side panel mounts one or more belt support blocks 293 extending transversely from each side panel toward the opposite side panel. The endless belt is adapted to ride over the block and to be supported thereby. A drive shaft 295 interconnects the two pulleys disposed nearest to the first end portion of the frame and is connected in driving relation thereto. A drive motor 297 which can be of any suitable construction, such as an electric motor or the like, is connected in driving relation to the drive shaft by means of a belt 299 looped about the shaft and a drive pulley on the motor.

The apparatus provides a first switch 301 disposed in proximity to one side panel of the frame and having a trigger 302 disposed to be engaged by a container-engaging member to signal that a container has been carried from the container-receiving station to the pre-fill station.

A second switch 304 having a trigger 305 is borne on the side wall opposite to the first switch and is disposed to be engaged for actuation by the switch trigger shaft 81 mounted on the rod 75.

A third switch 308 is borne rearwardly of the container pre-fill station and provides a trigger 309 disposed in upstanding relation adjacent to the rearward edge of the pre-fill station. The trigger is disposed to be actuated by a container received upon the pre-fill station platform to signal the actuating cylinder connected to the gate of the article-diverting assembly to open to permit articles to descend into the container residing upon the pre-fill station.

A fourth switch 311 is mounted by the final-fill station and has a trigger 312 disposed to be engaged by the container received upon the final-fill station. As will be apparent from the discussion below, upon activation of the switch by a container received on the final-fill station, the actuating cylinder connected to the door of the gate-diverting assembly is signaled to open the door to permit articles to be sent into the container received upon the final-fill station.

A fifth switch 314 is connected to the scale of the final-fill station and is adapted to be actuated upon loading of the scale to a predetermined final-fill weight for the container, whereby upon actuation of the fifth switch, the actuating cylinder is signaled to close the door to prevent further articles from leaving the chute for a container received on the final-fill station.

FIG. 12 illustrates a schematic circuit diagram of an electrical circuit adapted for use in the apparatus. FIG. 12 also shows a schematic flow diagram of a pneumatic system adapted to operate the actuating cylinders of the apparatus.

Referring more particularly to the circuit diagram, the apparatus provides an electrical conductor 320 adapted to be connected to a source of electrical energy. An on/off switch 322 is connected to the electrical conductor. An electrical conductor 324 is connected to the on/off switch. An electrical conductor 326 is connected to the electrical conductor 324. The first switch 301 is connected to the electrical conductor 326. An electrical conductor 328 leads from the first switch to a control relay contact 330. The second switch 304 is connected to the electrical conductor 326 and an electrical conductor 333 connects the second switch to a control relay 335. An electrical conductor 337 leads from the control relay 335. An electrical conductor 340 leads from the electrical conductor 335 back to the source of electrical energy. An electrical conductor 343 leads from the electrical conductor 340 to a control relay contact 345 connected through the motor 297 for operating the container-conveying assembly. An electrical conductor 350 leads from the control relay contact 330 to the electrical conductor 343.

An electrical conductor 355 leads from the electrical conductor 324 to the fifth switch 314 connected in series by an electrical conductor 357 to the fourth switch 311. An electrical conductor 360 connects the fourth switch 311 to a four-way valve solenoid 362, which is also connected to the electrical conductor 340 leading back to the source of electrical energy.

Optionally, an electrical conductor 363 leads from the electrical conductor 355 to a manual on/off switch 365 which is connected by an electrical conductor 367 to a motor 370 which is connected by electrical conductor 373 to electrical conductor 340.

An electrical conductor 380 connects electrical conductor 355 to the third switch 308 which is connected by an electrical conductor 383 to a control relay 385 which in turn is connected by an electrical conductor 388 to the electrical conductor 340.

An electrical conductor 390 is connected to the electrical conductor 355 and leads to a control relay contact 392 connected in series by an electrical conductor 394 to a control relay contact 396 connected by an electrical conductor 398 to a second four-way valve solenoid 400 which in turn is connected by an electrical conductor 402 to the electrical conductor 340.

Referring more particularly to the schematic flow diagram of the pneumatic system adapted for use in the preferred embodiment, it will be understood that a conventional source of gas pressure, not shown, is provided. A pressure line 500 leads to a four-way valve 503. An exhaust line 505 departs from the four-way valve. A first gas flow line 507 leads from the four-way valve to the cylinder portion 279 of the actuating cylinder 275. A second flow line 510 leads from the four-way valve to the opposite end of the cylinder portion of the actuating cylinder 275. A flow line 512 leads from the flow line 510 to the actuating cylinder 250 connected to the door 240 of the chute member 220. An exhaust line 515 exits from the actuating cylinder.

A four-way valve 520 is connected to the source of gas pressure by a pressure line 522. An exhaust line 525 leads from the four-way valve. A first gas flow line 527 leads from the four-way valve 520 to the retention cylinder 140. A second flow line 530 leads from the four-way valve 520 to the opposite end of the retention cylinder 140 to exert force on the piston 142 in a direction opposite to that exerted by the gas delivered by the first flow line.

As can best be seen in FIGS. 7 through 10, the apparatus 10 of the present invention is adapted for filling containers 550, such as cartons or the like of predetermined dimensions, with articles 553, such as fruit or the like. The apparatus is adapted to receive containers from a source of container supply (not shown) and to deliver filled containers to a container-conveying assembly 557, such as a conventional roller conveyor similar to that depicted schematically and fragmentarily in FIG. 10.

Figure 10:
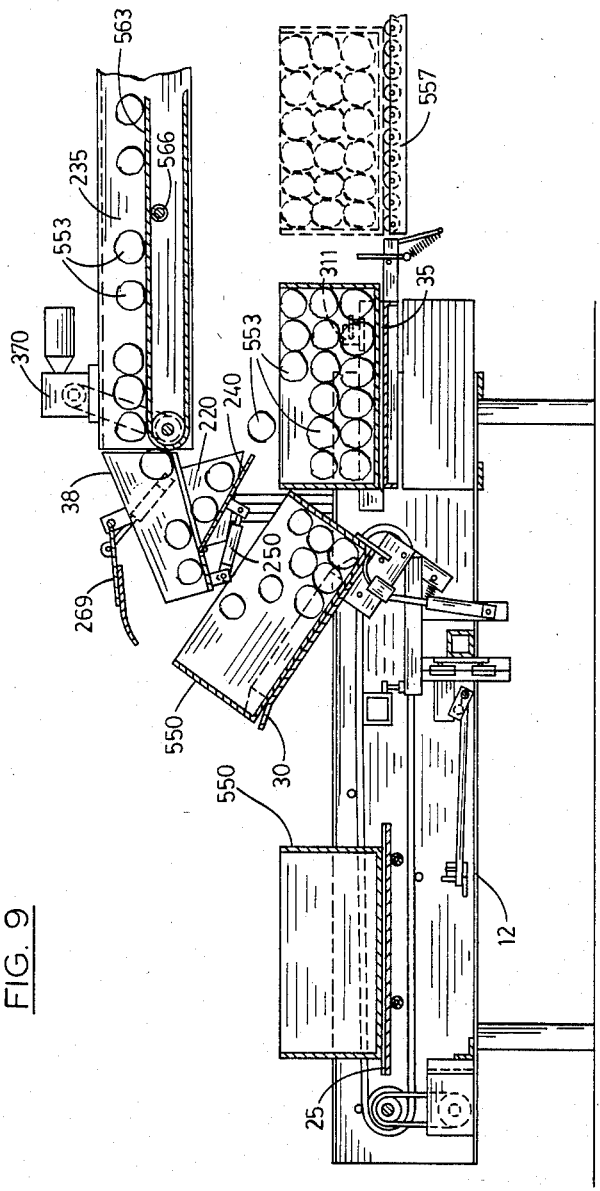
FIG. 10 is a side elevation of the apparatus of FIG. 7 with a first container disposed in a second article-receiving attitude; a second container disposed in the first article-receiving attitude; and a third container disposed in trailing relation to the second container.

The apparatus is adapted to be disposed in receiving relation to an article-delivery assembly 560, such as that depicted fragmentarily and schematically in FIG. 10, providing an endless belt 563 carried on rollers 566 and driven by a motor 370, or the like.

OPERATION

The operation of the apparatus 10 of the present invention is briefly summarized with particular reference to FIGS. 7, 8, 9 and 10.

As shown in FIG. 7, a first container 550 of a plurality of entrained containers (not shown) is delivered to the container-receiving station 25 as by a conveyor (not shown) or the like. The gate 269 and sweep member 272 are disposed in occluding relation to the chute 220, and the door 240 is disposed in a closed attitude. The motor 297 is activated by operation of the on/off switch 322 to begin driving the endless belt 288 to carry a pair of container-engaging members 290 into engagement with the container. The container is forced toward the container pre-fill station 30 and onto the container support tray 103, as is depicted in phantom lines in FIG. 7. Substantially simultaneously, or subsequent to such motion of the first container, a second container 550 is preferably delivered to the container-receiving station 25, as shown in FIG. 8. As the first container moves from the container-receiving station to the container pre-fill station 30, the first switch 301 is engaged by it and activated to stop the motor 297 to prevent the belt from carrying the containers further than desired.

As the lead container is fully deposited on the tray 103, and depresses the trigger 305 of the third switch 308, actuating cylinder 275 connected to the gate 269 of the chute 220 releases the piston portion of the retention cylinder 140 connected to the tray support frame 93 of the container pre-fill station. Thus, substantially simultaneously, the gate 269 is lifted into an opened attitude to permit articles 553 to depart from the chute, and the container 550 supported on the tray is elevated into an elevated attitude substantially as depicted in FIG. 8, whereby the opening of the container is disposed in receiving relation to the main chute.

As the container rapidly fills with articles, it is obvious that its weight increases. With such increase in weight, the container is drawn by gravity downwardly towards its resting position, overcoming the force exerted by the spring 130 on the frame actuating arm 100.

Figure 9:
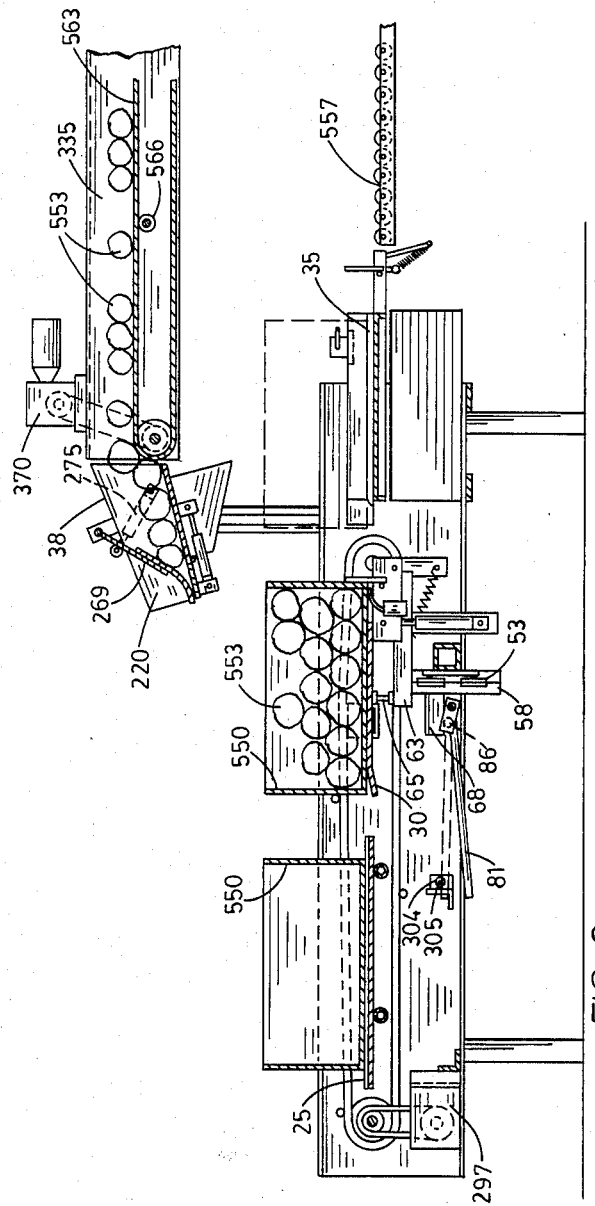
FIG. 9 is a side elevation of the apparatus of FIG. 7 showing the first container of FIG. 8 partially filled with articles, the container being shown in a second article-receiving attitude in phantom lines.

When the container has been returned to its original resting position, as shown in FIG. 9, the tray engages the bolt 65 on the mounting arm 63 and exerts downwardly directed weight against the double V-shaped beam 58. The beam 58 travels downwardly between the rollers 48 and 53 and the detent 68 engages the detent stop 86. With continued increase of the weight of the container, the detent 68 exerts greater force against the detent stop 86 to pivot the switch trigger rod 81 away from engagement with the trigger 305 of the second switch 304. Upon disengagement of the switch by the rod, the motor 297 is reactivated to move the containers ahead, whereby the lead container is caused to travel toward the final-fill station 35 and the trailing container is caused to travel onto the tray of the pre-fill station. A third container should then be carried onto the container-receiving station from the source of containers. Also, at the same time, the gate 269 is closed by operation of the actuating cylinder 275 which is also signalled by the second switch 304, preventing additional articles from departing from the main chute 220 while the containers change positions.

As the lead container moves into its final position on the apparatus, as can best be seen in FIG. 10, resting atop the final-fill station 35, the trailing container simultaneously is driven onto the tray of the pre-fill station. Thus, when the containers have moved to the positions indicated generally in FIG. 10, the lead container engages and activates the trigger 312 of the fourth switch 311 and the trailing container engages and activates the trigger of the third switch 308. Engagement of the third switch by the trailing container causes the repetition of the operation described immediately above to direct articles into the trailing container. Activation of the fourth switch causes the actuating cylinder 250 connected to the door 240 of the secondary chute 220 to move the door into an opened attitude whereby some of the articles, which would otherwise travel down the chute 220 to the trailing container, will be trickled or diverted in a lesser volume toward the container on the final-fill station.

When the trailing container is filled to a predetermined pre-fill weight, the gate 269 closes and the container is once again in a substantially horizontal attitude, stationary upon the tray. When the lead container upon the final-fill station 35 has received a sufficient number of articles to attain a desired final-fill weight, the fifth switch 314 is activated by the scale 183 to close the door 240 to prevent the departure of any further articles.

When the fifth switch 314 is closed, it permits the electrical circuit to activate the motor 297 once again to begin movement of the train of the containers along the frame 12 of the apparatus. It is not until both the first, or leading, container on the final-fill station and the second, or trailing, container at the pre-fill station, have gained their approximate predetermined final-fill and pre-fill weights, respectively, that the system causes the belt to carry the containers ahead.

Upon complete filling of the lead container, and movement of the belt, the lead container is forced by the trailing container to exit the final-fill station for delivery of the lead container to a conventional container-conveying mechanism 557 to leave the apparatus.

It will be apparent from the foregoing that the container residing on the platform of the pre-fill station is filled at a much more rapid rate than that on the final-fill station, due to the volume of articles which can be permitted to travel through the chute and exit through the opened gate area. Further, the opening defined by the interior edge of the bottom panel of the chute can be varied as to dimensions to control the maximum quantity of articles which can be fitted or passed through the opening defined by the edge at any given time. Thus, of a stream of articles delivered to the chute, a substantially uniform percentage can be diverted through the opening when the door is disposed in an opened attitude.

Accordingly, it will be seen that the operation of the apparatus permits very precise and controlled filling of containers to predetermined weights while maintaining a simplicity of construction previously unavailable in the art.

Although the invention has been shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An apparatus for filling containers with a predetermined weight of articles delivered to the apparatus from an article source comprising a frame; a first station borne by the frame for receiving unfilled containers from a container source; a second station borne by the frame adapted to support an unfilled container for the deposit of articles in the container; a third station borne by the frame adapted to support a partially-filled container for the deposit of articles in the container; a chute assembly adapted to direct a stream of articles toward a container supported on the second station, an article diverting assembly having a primary chute portion adapted to receive a stream of articles from the source of articles, the primary chute portion being operable to direct articles to a container supported on the second station, and providing a secondary chute operable to divert articles from the stream of articles in the primary chute to a container supported on the third station; and control means interconnecting the delivery means and the article diverting assembly for causing the operation and the cessation of operation of the primary chute portion and secondary chute when containers are supported on the second and third stations.

2. An apparatus for filling containers with a predetermined weight of articles delivered to the apparatus from a source of articles comprising
a frame;

a first station borne by the frame and adapted to support individual unfilled containers deposited on the first station;

a second station adapted to support containers delivered from the first station and having weight sensing means for determining when a container delivered to the first station has been filled with a predetermined approximate weight of articles;

a third station adapted to support containers delivered thereto from the second station and having weight sensing means for determining when a container delivered to the third station has been filled with an additional approximate predetermined weight of articles;

delivery means for delivering containers individually from the second station to the third station;

an article-diverting assembly having a primary chute portion adapted to receive a stream of articles from the source of articles, the primary chute portion being operable to direct articles to a container supported on the second station, and providing a secondary chute actuable to divert articles from the stream of articles in the primary chute to a container supported on the third station; and control means interconnecting the delivery means and the article-diverting assembly for causing the operation and cessation of operation of the primary chute portion and secondary chute when containers are supported on the second and third stations.

3. The apparatus of claim 2 wherein the second station provides means for elevating a container supported thereon into an article-receiving attitude in proximity to the chute portion.

4. The apparatus of claim 2 wherein the primary chute portion provides a gate member operable to prevent articles from exiting the primary chute portion toward a container on the second station.

5. The apparatus of claim 4 wherein the secondary chute provides a door member operable to occlude the secondary chute to prevent articles from being diverted to a container on the third station.

6. The apparatus of claim 5 wherein the control means are selectively operable to cause the gate member to operate to prevent articles from exiting the primary chute portion.

7. The apparatus of claim 6 wherein the control means are selectively operable to cause the door member to occlude the secondary chute.

8. The apparatus of claim 7 wherein the control means automatically operates to cause the gate member to operate to prevent articles from exiting the primary chute portion when a container on the second station has been filled to a predetermined weight.

9. The apparatus of claim 8 wherein the control means automatically operates to cause the door member to occlude the secondary chute when a container supported on the third station has been filled with a predetermined weight of articles.

10. The apparatus of claim 9 wherein the delivery means is operable only when both the primary chute member and secondary chute are operated to prevent the exit of articles from the article-diverting assembly.

11. The apparatus of claim 10 wherein the delivery means includes an endless belt borne by the frame; motor means for causing movement of the belt; and a plurality of container-engaging members carried by the belt and dimensioned to engage a container to move the container along the frame.

12. The apparatus of claim 2 wherein the primary chute portion provides a substantially flat bottom panel having an edge defining an opening through the bottom panel, and a pair of spaced walls bounding the bottom panel and disposed to guide the stream of articles through the primary chute portion toward the second station; and the secondary chute provides a door dimensioned to occlude the opening and mounted for pivotal movement between a first attitude wherein the opening is occluded and a second attitude wherein the opening is not occluded.

13. The apparatus of claim 12 wherein the control means is connected to the weight sensing means, and the control means causes the door to move to the second attitude when a container supported on the third station contains a predetermined weight of articles.

14. The apparatus of claim 13 wherein the delivery means further includes means for moving a container from the first station to the second station.

15. An apparatus for depositing a predetermined weight of articles delivered to the apparatus from a source of articles in containers, the apparatus comprising a container-receiving station adapted to support an unfilled container;

a pre-fill station adapted to support a container delivered thereto from the container-receiving station in a first attitude, the pre-fill station providing means for elevating the container into a second attitude wherein the container is disposed to receive articles delivered from the source of articles;

first weight sensing means for determining when an approximate predetermined first weight of articles have been received in a container on the pre-fill station;

a final-fill station adapted to support a container containing said first weight of articles delivered thereto from the pre-fill station;

second weight sensing means for determining when an approximate predetermined second weight of articles have been deposited in a container on the final-fill station;

transport means for delivering containers from the container-receiving station to the pre-fill station and from the pre-fill station to the final-fill station;

an article-diverting assembly disposed in article-delivering relation to the pre-fill station and final-fill station and adapted to be deployed in article-receiving relation to the source of articles, the assembly providing a bottom panel having an aperture therethrough and a pair of walls disposed in upstanding relation oppositely of the bottom panel to define a primary chute disposed to direct a stream of articles exiting the chute toward a container supported on the pre-fill station;

a gate adapted to be deployed in occluding relation to the primary chute to prevent articles from exiting therefrom;

a pair of panels disposed oppositely of the aperture and a door pivotable between the panels between a first position wherein the door occludes the aperture and a second position wherein the door is removed from the aperture to define a secondary chute disposed to direct articles passing through the aperture to a container supported on the final-fill station;

door moving means for deploying the door in the second position when a container is supported on the final-fill station containing approximately the first weight of articles; and gate moving means for deploying the gate in occluding relation to the primary chute when a container is supported on the pre-fill station containing less than the first weight of articles.

16. The apparatus of claim 15 wherein the door moving means includes means for moving the door to the first position when a container on the final-fill station contains approximately the second weight of articles and for maintaining the door in the first position until a container containing approximately the first weight of articles is delivered to the final-fill station.

17. The apparatus of claim 16 wherein the transport means delivers containers to the pre-fill station and final-fill station only when the gate is deployed in occluding relation to the primary chute and the door is disposed in the first position.

18. An apparatus for filling containers with a predetermined weight of articles delivered to the apparatus from a source of articles comprising an article diverting assembly having a primary chute adapted to receive a stream of articles from a source of articles, the primary chute being operable to direct articles from the primary chute to a container supported on the second station, and providing a secondary chute adapted to divert articles from the stream of articles in the primary chute to the container supported on the second station; and container means interconnecting the delivering means and the article diverting assembly for causing the operation and cessation of operation of the primary chute and secondary chute when containers are supported on the second and third stations.

19. An apparatus for approximately substantially filling successive containers with a predetermined weight of articles delivered to the apparatus from a source of such articles, comprising a first station adapted to support individual unfilled containers deposited on the first station;

a second station adapted to support containers delivered to the first station and having weight sensing means for determining when a container delivered to the first station has been filled with an additional approximate weight of the articles;

a third station adapted to support containers delivered thereto from the second station and having weight sensing means for determining when a container delivered to the third station has been filled with an additional approximate predetermined weight of the articles;

delivering means for delivering containers individually from the second station to the third station;

an article diverting assembly having a primary chute portion adapted to receive containers of articles from the source of articles, the primary chute being operable to divert articles to a container supported on the second station and providing a secondary chute adapted to divert articles from the stream of articles and the primary chute to a container supported on the third station; and control means interconnecting the delivery means and the article diverting assembly for successively causing the operation and cessation of operation of the primary chute portion and secondary chute when containers are supported on the second and third stations.

* * * * *